(12) United States Patent
Kurosawa

(10) Patent No.: US 8,027,577 B2
(45) Date of Patent: Sep. 27, 2011

(54) CAMERA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/697,409

(22) Filed: Feb. 1, 2010
(Under 37 CFR 1.47)

(65) Prior Publication Data

US 2010/0329653 A1    Dec. 30, 2010

(30) Foreign Application Priority Data

Feb. 3, 2009    (JP) .................................. 2009-022453

(51) Int. Cl.
*G03B 17/00* (2006.01)
(52) U.S. Cl. .......................................... 396/49; 396/50
(58) Field of Classification Search .................... 396/49, 396/50
See application file for complete search history.

(56) References Cited

U.S. PATENT DOCUMENTS

| | | | |
|---|---|---|---|
| 5,768,640 A * | 6/1998 | Takahashi et al. | 396/310 |
| 5,913,078 A * | 6/1999 | Kimura et al. | 396/50 |
| 6,282,362 B1 * | 8/2001 | Murphy et al. | 386/224 |
| 6,292,215 B1 * | 9/2001 | Vincent | 348/169 |
| 6,346,980 B1 | 2/2002 | Tani et al. | |
| 6,759,979 B2 * | 7/2004 | Vashisth et al. | 342/357.31 |
| 6,859,619 B2 | 2/2005 | Kurosawa | |
| 6,873,357 B2 | 3/2005 | Fuchimukai et al. | |
| 7,408,137 B2 * | 8/2008 | Sawachi | 250/208.1 |
| 7,436,434 B2 * | 10/2008 | Shibutani | 348/207.99 |
| 2003/0032436 A1 * | 2/2003 | Mikuni | 455/457 |
| 2009/0086014 A1 * | 4/2009 | Lea et al. | 348/25 |

FOREIGN PATENT DOCUMENTS

JP    2004-032286    1/2004

* cited by examiner

*Primary Examiner* — Rodney Fuller
(74) *Attorney, Agent, or Firm* — Greenblum & Bernstein, P.L.C.

(57) ABSTRACT

A camera comprising a location sensor, a first recorder, a first calculator, and a first motor, is provided. The location sensor detects the present location of the camera. The first recorder records a past location. The past location is a location where an image was photographed at a previous point in time. The first calculator compares the present location of the camera with the past location. The first calculator calculates a first difference between the present location of the camera and the past location. The first monitor displays the calculated first difference.

9 Claims, 6 Drawing Sheets

FIG.5A

|  | PRESENT STATUS | | CORRECTION VALUE | | DETERMINATION |
|---|---|---|---|---|---|
| LOC. | N.L. | 35° 40' 30" | F.R. | FRONT 02m 10cm | NG |
| | E.L. | 139° 39' 30" | L.R. | RIGHT 01m 20cm | |
| | ALT. | 20m 05cm | U.L. | LOW 00m 05cm | |
| ORIENTATION | AZM. | 35° 55' 30" | DIR. | TURN LEFT 20° 5' 30" | NG |
| | F.R. | FRONT 5° 00' 30" | F.R. | REAR 5° 0' 30" | |
| | L.R. | RIGHT 10° 20' 00" | L.R. | LEFT 10° 20' 00" | |
| FOCAL LENGTH | | 36mm | | SHORTEN 8mm | NG |

FIG.5B

|  | PRESENT STATUS | | CORRECTION VALUE | | DETERMINATION |
|---|---|---|---|---|---|
| LOC. | N.L. | 35° 42' 30" | F.R. | 00m 00cm | OK |
| | E.L. | 139° 36' 30" | L.R. | 00m 00cm | |
| | ALT. | 19m 05cm | U.L. | 00m 00cm | |
| ORIENTATION | AZM. | 15° 50' 00" | DIR. | 00° 00' 00" | OK |
| | F.R. | 00° 00' 00" | F.R. | 00° 00' 00" | |
| | L.R. | 00° 00' 00" | L.R. | 00° 00' 00" | |
| FOCAL LENGTH | | 28mm | | 0mm | OK |

CAMERA

BACKGROUND OF THE INVENTION

1. Field of the Invention

The present invention relates to a camera that has a function to photograph a targeted object from a fixed point under a fixed condition.

2. Description of the Related Art

Fixed-point photography is known. In fixed-point photography, photographing is carried out from a fixed point at a fixed time interval or under a fixed focal length. For example, fixed-point photography is carried out when photographing a certain landscape during different seasons by photographing it at several different times. By fixing a camera in one position, fixed-point photography can be easily carried out. Accordingly, a camera used in fixed-point photography, such as a surveillance camera, is generally fixed at a certain location. For an amateur photographer who is practicing fixed-point photography as a hobby, it would be incommodious for the hobbyist to fix the position of the camera. In such a case, a user should set up a camera at the same location where the camera was used on a previous photographing operation and make sure that all photographing conditions, such as angle of view (equivalent to focal length) and photographing direction, coincide with the photographing conditions from the previous photographing operation. But it is difficult to measure and record the exact location where the camera was set up on a previous photographing operation. And even if a user was successful at measuring and recording the location, it would be very difficult to determine the exact position of the camera on the previous photographing operation, and then accurately reposition camera exactly as it was before. Neither is it easy to set the angle of view and photographing direction by referring to a photograph taken during a previous photographing operation. In Japanese Unexamined Patent Publication No. 2004-32286, a camera apparatus having a GPS receiver and an azimuth sensor, which measure the location of the camera apparatus and the photographing azimuth, respectively, and having a function to generate location and azimuth data and add them to the image data generated during the photographing operation is described. Using such a camera apparatus, fixed-point photography can be carried out by setting up the camera at the exact same location and orientation on the basis of the recorded location and direction data.

However, the camera apparatus provides only location and direction data. For fixed-point photography, a user should also measure the present location and photographing direction of a camera, and then position the camera so that the present location and photographing direction coincide with the recorded location and photographing direction, respectively. But setting up a camera for fixed-point photographing under these conditions is both tedious and time-consuming.

SUMMARY OF THE INVENTION

Therefore, an object of the present invention is to provide a camera that enables fixed-point photography to be carried out easily and without increasing a user's workload.

According to the present invention, a camera, comprising a location sensor, a first recorder, a first calculator, and a first motor, is provided. The location sensor detects the present location of the camera. The first recorder records a past location. The past location is a location where an image was photographed at a previous point in time. The first calculator compares the present location of the camera with the past location. The first calculator calculates a first difference between the present location of the camera and the past location. The first monitor displays the calculated first difference.

BRIEF DESCRIPTION OF THE DRAWINGS

The objects and advantages of the present invention will be better understood from the following description, with reference to the accompanying drawings in which:

FIG. 5 is a table displaying the present information of the correction values, and the determination message.

DESCRIPTION OF THE PREFERRED EMBODIMENTS

Figure 1:
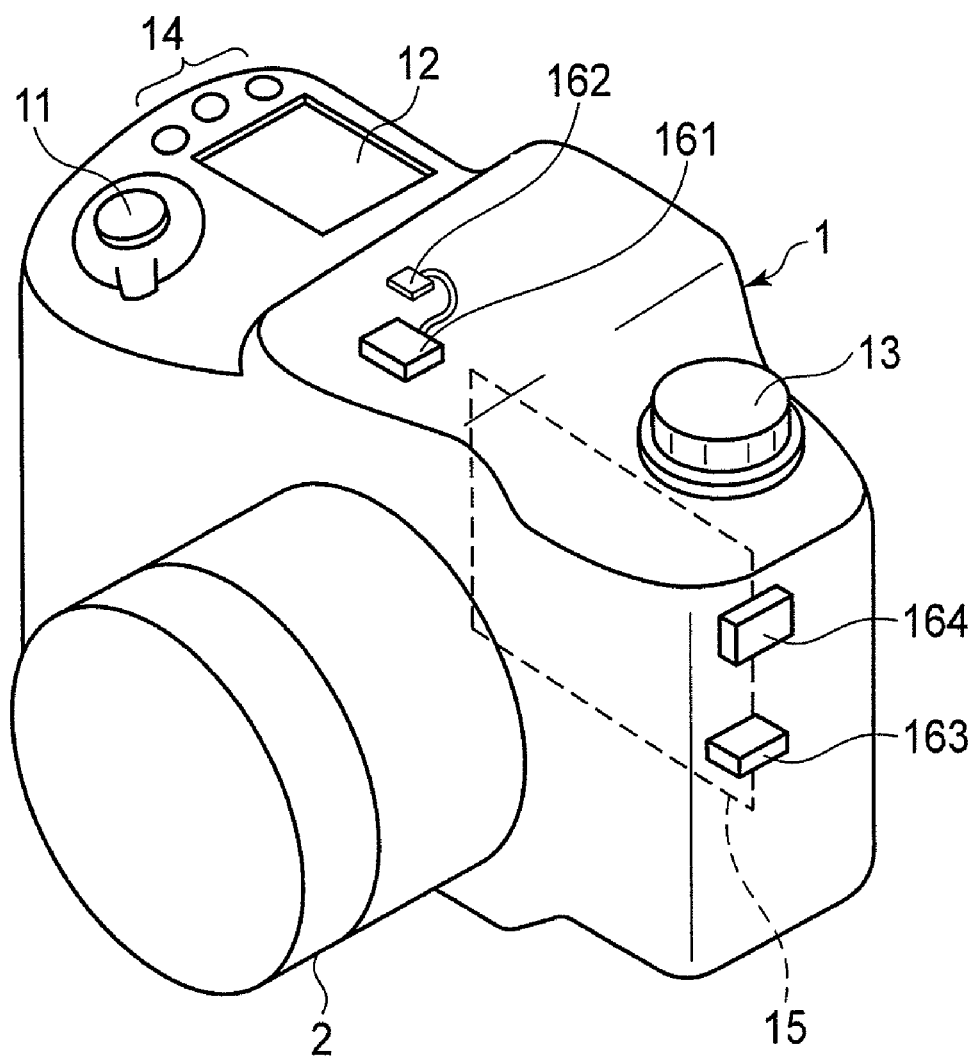
FIG. 1 is a schematic illustration of a digital single-lens reflex camera of the first embodiment of the present invention.

The present invention is described below with reference to the embodiment shown in the drawings.

FIG. 1 illustrates the schematic appearance of a digital single-lens reflex camera of the first embodiment of the present invention. An explanation of the general structure of a digital single-lens reflex camera, hereinafter referred to as "camera", has been omitted. The components of the camera include a camera body 1 and a photographic lens 2. The photographic lens 2 can be connected and disconnected from the camera body 1. In the camera body 1, a release switch 11, an LCD display 12, a mode selection dial 13, a general selection switch, and a monitoring apparatus 15 (see broken line) are mounted. As described later, the operation mode of the camera can be set to the fixed-point photographing mode by the mode selection dial 13. When the operation mode is set to the fixed-point photographing mode, a sub-operation mode that is either a recording mode or a photographing mode can be selected. In the photographing mode the LCD display 12 or the monitoring apparatus 15 indicate whether the present location, azimuth, and so on, of the camera coincide with photographing information recorded in the information memory. Also in the photographing mode, some operating characteristics of the camera are automatically adjusted so that the present photographing conditions coincide with the photographing conditions recorded in the information memory. In the recording mode, an image can be selected and displayed among a plurality of previously photographed images that were stored with certain photographing information in a personal computer apparatus. When an image is selected, photographing information pertaining to the selected image is recorded in the information memory. In addition, in the camera body 1, a GPS sensor 161 (location sensor), a GPS antenna 162, an orientation sensor 163 (posture sensor), and an azimuth sensor 164 are mounted.

Figure 2:
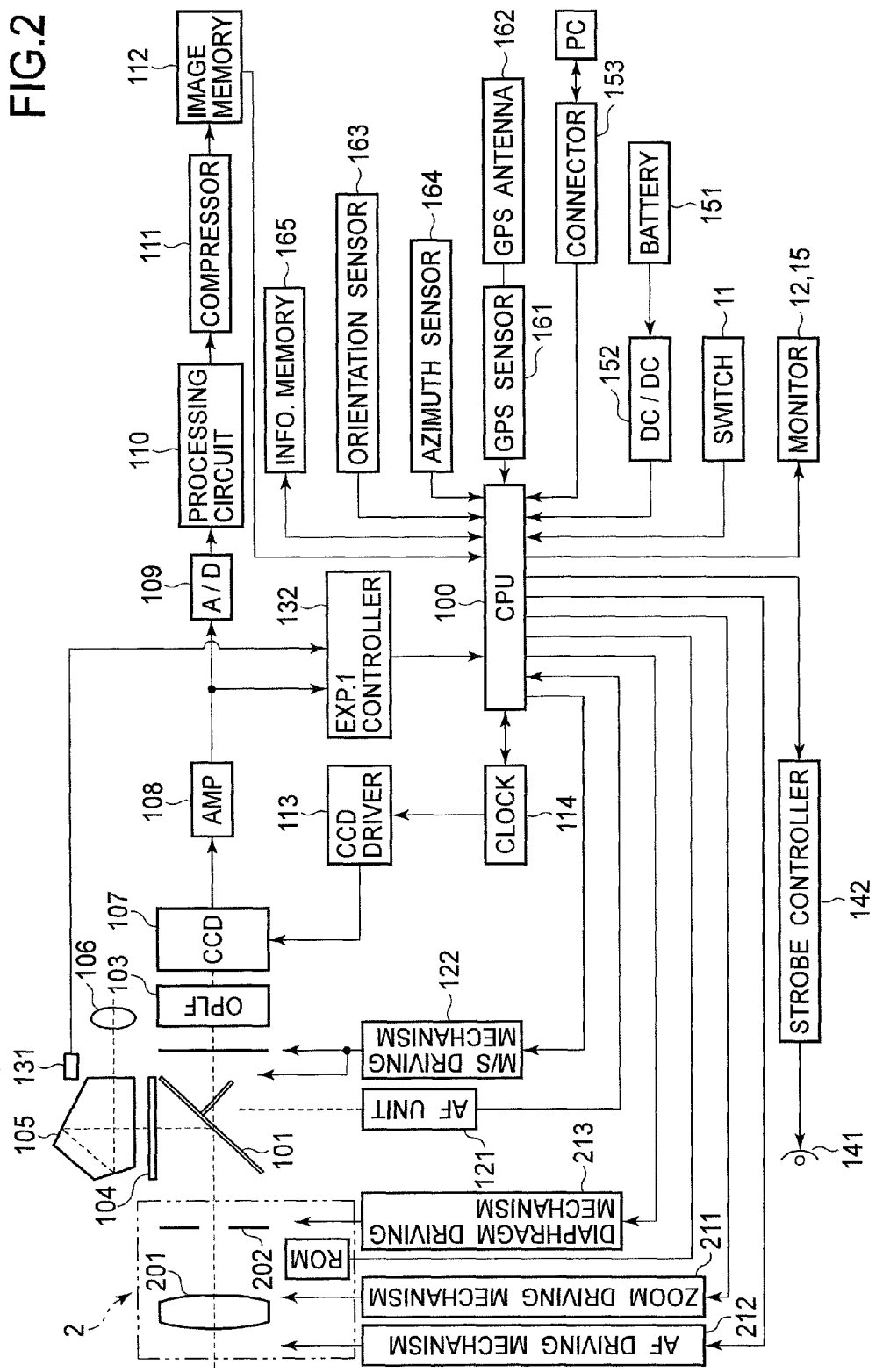
FIG. 2 is a block diagram showing the internal structure of the camera.

FIG. 2 is a block diagram showing the internal structure of the camera. The camera has a photographing mechanism for photographing an image of a target object that is brought into focus by the photographic lens 2. The photographing mechanism includes a quick-return mirror 101, a shutter 102, an optical LPF 103, a focusing glass 104, a pentaprism 105, an eyepiece 106, in addition to other components. The image is brought into focus on an image sensor 107, such as a CCD, and an image signal is generated. The generated image signal is amplified by the amplifier 108. The image signal is digitized by an A/D converter 109. The image signal is converted into image data by a signal processing circuit 110. The image data can be compressed by a data compressor 111. The compressed image data, or uncompressed image data, is recorded in an image memory 112. A CCD driver 113 and a clock generator 114 are mounted in the camera and controlled by the CPU 100 to order the image sensor 107 to capture an image. In addition, the CPU 100 controls a zoom driving mechanism 211 (focal length detector, zoom adjuster), an AF driving mechanism 212 (autofocus controller), a diaphragm driving mechanism 213, an AF unit 121, and a mirror and shutter driving mechanism 122. The zoom driving mechanism 211 is mounted in the photographic lens 2 and drives the lens mechanism 201 when the lens mechanism 201 sets the angle of view of the photographic lens 2. The AF driving mechanism 212 is mounted in the photographic lens 2 and drives the lens mechanism 201 when the lens mechanism 201 brings a targeted object into focus on the image sensor 107. The diaphragm driving mechanism 213 is mounted in the photographic lens 2 and drives the lens mechanism 201 and a diaphragm 202 when the lens mechanism 201 and the diaphragm 202 are setting exposure conditions. The AF unit 121 and the mirror and shutter driving mechanism 122 are mounted in the camera body 1. In addition, the camera has a photometric element 131, an exposure controller 132, a strobe 141, a strobe controller 142, a battery 151, a DC/DC converter 152, and a connector 153. The photometric element 131 and the exposure controller 132 are used for measuring the photometric quantity of a targeted object. The strobe 141 and the strobe controller 142 are used for strobe photography. The battery 151 is a power source for the camera. The connector 153 is used for connecting the camera to a personal computer.

In addition, as described above, the camera has the GPS sensor 161 and the GPS antenna 162 for measuring the location of the camera, the orientation sensor 163 for measuring the posture of the camera, the azimuth sensor 164 for measuring the azimuth of the optical axis of the camera, and the information memory 165 for recording the measured information. The GPS sensor 161, the orientation sensor 163, the azimuth sensor 164, and the information memory 165 are connected to the CPU 100. The CPU 100 records the information measured by the sensors in the image memory 112, or reads out the information recorded in the image memory 112 and records the read-out information in the information memory 165. In addition, the CPU 100 can compare the measured information with the recorded information and carry out fixed-point photographing operations.

The GPS sensor 161 measures location information using a GPS satellite. The location information includes the longitude, latitude, and altitude of the camera. An explanation of the GPS mechanism has been omitted because the mechanism is widely known. The GPS sensor 161 constitutes a GPS module of an all-in-one-package type that carries out the GPS operation by connecting the GPS sensor 161 to the antenna 162 and to the power supply. As shown in FIG. 1, the GPS sensor 161 and the GPS antenna 162 are mounted in the camera body 1 and obtain power from the power source of the camera.

Figure 3:
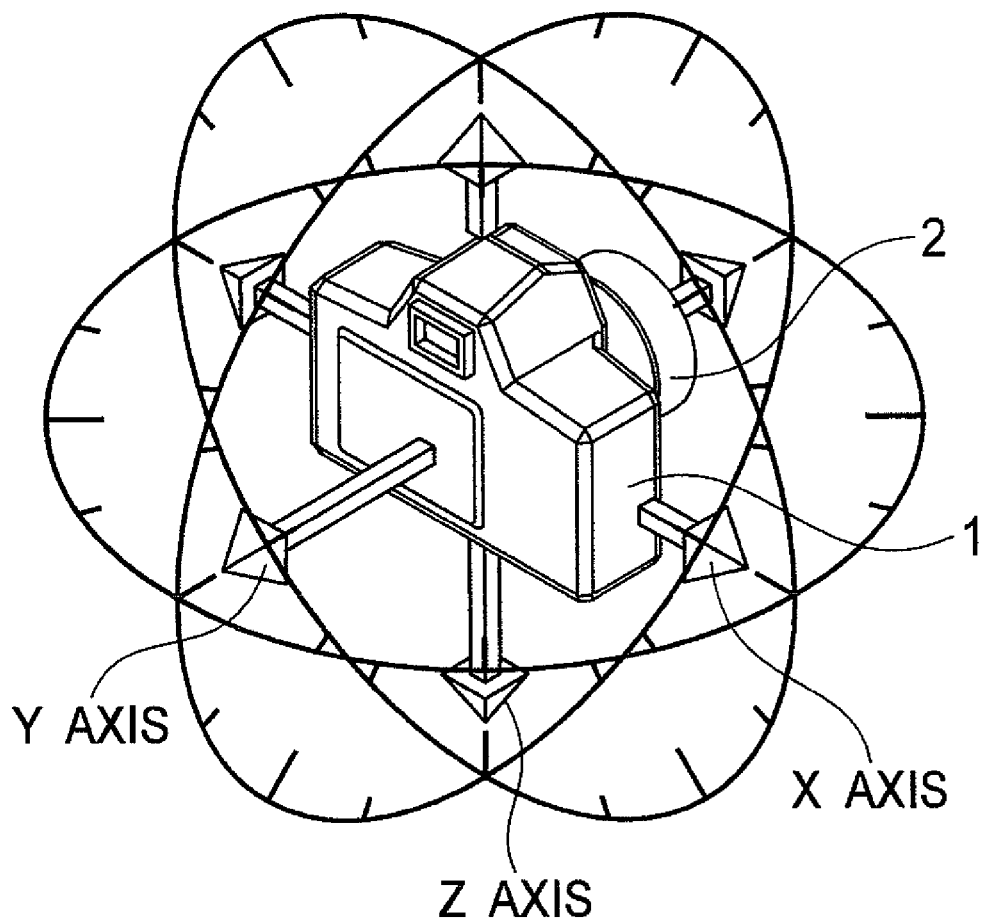
FIG. 3 is a schematic illustration of a camera with respect to three axes showing the position and direction of the camera.

The orientation sensor 163 includes a three-axis acceleration sensor and is mounted in the camera body 1 as shown in FIG. 1. The three-axis acceleration sensor can measure posture information by detecting components of acceleration along the X, Y, and Z axes that are perpendicular to each other. The posture information includes angles of inclination for each axis with respect to the horizon and the plumb line. As shown in FIG. 3, the orientation sensor 163 is mounted in the camera body 1 so that the three-axis acceleration sensor can detect the accelerations in the directions along the X, Y, and Z axes that correspond to the width direction of the camera body 1, the direction of the optical axis of the camera (equivalent to the optical axis of the photographic lens 2) perpendicular to the width direction, and the height direction of the camera body 1 perpendicular to the optical axis and the width direction, respectively. By mounting the orientation sensor in the above manner, the angles of inclination of the camera body 1 with respect to the horizontal plane and the plumb line can be detected, and the posture information can be measured accordingly.

The azimuth sensor 164 includes a magnetic direction sensor, such as an MR sensor or MI sensor that has two magneto-sensitive axes. The azimuth sensor 164 detects the azimuth of the optical axis with respect to the four cardinal points (North, East, South or West) using terrestrial magnetism. The azimuth sensor 164 is mounted so that the two magneto-sensitive axes coincide with the X and Y axes. By mounting the azimuth sensor 164 and setting a standard azimuth to the optical axis of the camera, relative azimuth information including the azimuth of the optical axis of the camera i.e., the azimuth relative to the four cardinal points, can be measured.

The image memory 112 has a first memory area (first recorder) for recording the location information measured by the GPS sensor 161, which is in the Exif file format. The location information can be recorded in and read out from the first memory area. In addition, the image memory 112 has second and third memory areas, for recording the posture information measured by the orientation sensor 163 and the azimuth information measured by the azimuth sensor 164, respectively. The posture and azimuth information can be recorded in and read out from the second and third memory areas, respectively. In addition, the image memory 112 has a fourth memory area for recording photographing information, such as the focal length of the photographic lens 2, the aperture value, the shutter speed and other exposure conditions, the same as a general camera. The photographing information can be recorded in and read out from the fourth memory area. In addition, the information memory 165 can read out the location information, posture information, and azimuth information from the Exif-formatted image file. The above operations are controlled by the CPU 100.

As described above, the CPU 100 has a function for carrying out image processing on a photographed image, a function for controlling the operations of the components of the camera, and a function for recording and reading out information measured by the sensors in the information memory 165. In addition, the CPU 100 has functions for reading out location, posture, azimuth, and photographing information adhered to an image that is either recorded in a memory connected to the camera via the connector 153 and a personal computer, or displayed on a monitor of the personal computer. The CPU 100 also has functions for recording the information, which was read out, in the information memory 165 and for reading out the information recorded in the information memory 165. In addition, the information can be recorded in the information memory while displaying an image associated with the recorded information on the monitoring apparatus 15 of the camera, and not on the display of the personal computer.

Furthermore, the CPU 100 has a function for reading past information from the image memory 165. The past information includes the location, posture, azimuth and photographing information related to the location, posture, azimuth, and camera settings of a previously photographed image. The CPU 100 has a function for comparing the past information with the present information. The present information includes the location, posture, azimuth, and photographing information related to the location, posture and azimuth presently measured by the GPS sensor 161, orientation sensor 163 and azimuth sensor 164, and the present camera settings. In addition, the CPU 100 has functions for calculating correction values from the variations between the past and present information, and for displaying the calculated correction values on the LCD display 12 or monitoring apparatus 15. Especially in this embodiment, the correction values for the camera's location, posture, azimuth, and focal length can be displayed alongside the present location, posture, azimuth, and focal length by comparing the past and present location, posture, azimuth, and photographing information. The CPU 100 also displays a determination message indicating whether or not the correction values are within predetermined ranges. For example, the CPU 100 displays the determination message of "OK" when the correction values are zero or within the predetermined permissible range, and "NG" when the correction values are outside of the predetermined range.

Figure 4:
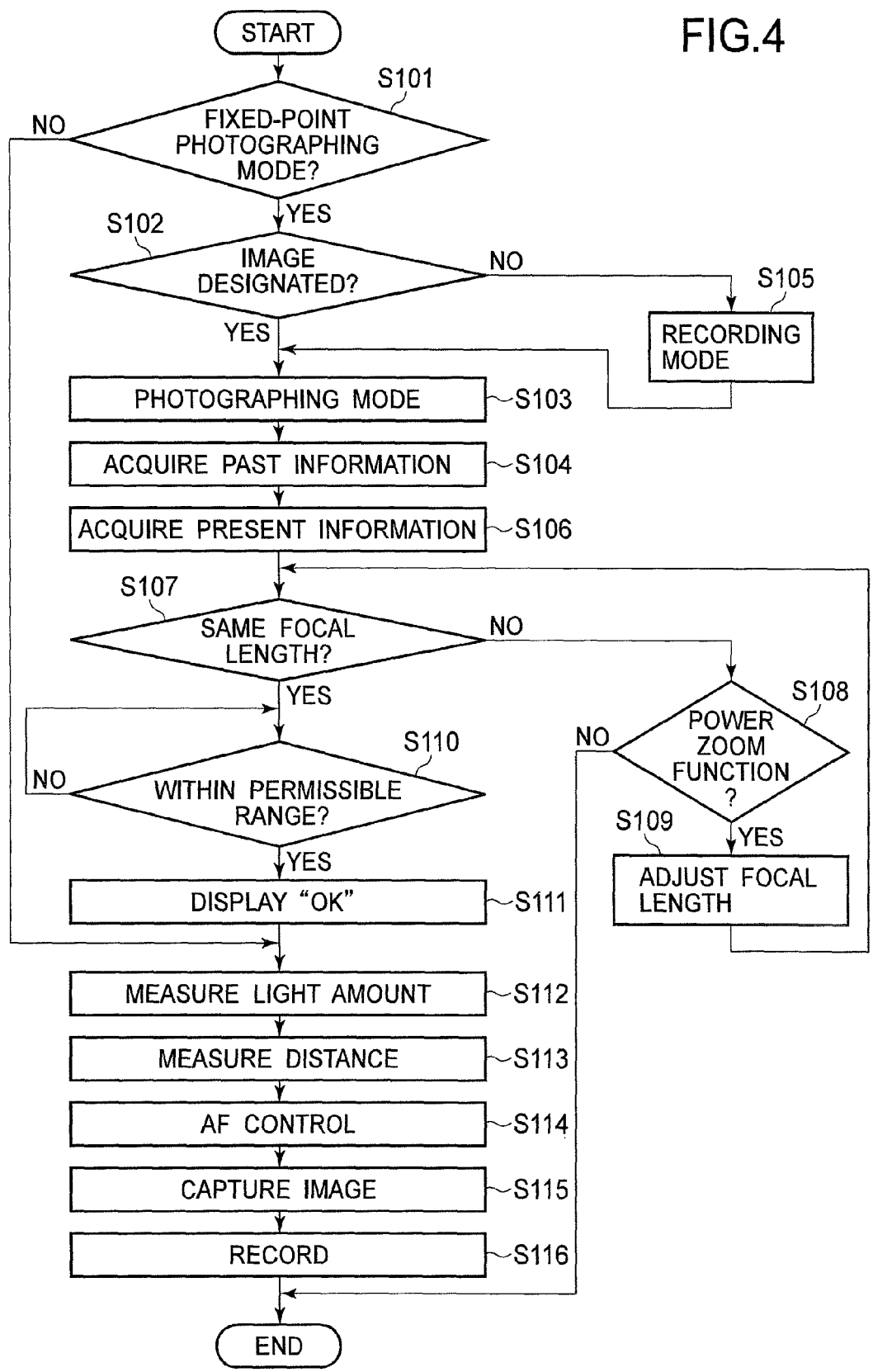
FIG. 4 is a flowchart illustrating the process of the fixed-point photographing operation.

The photographing operation of the camera is explained below using the flowchart of FIG. 4. If a user wants to carry out fixed-point photographing, the operation mode of the camera should be set to the fixed-point photographing mode by manipulating the mode selection dial 13. The CPU 100 determines whether or not the fixed-point photographing mode is set (S101). When the fixed-point photographing mode is not set, the process proceeds to the general photography process and the quantity and color of ambient light are measured (S112), distance is measured (S113), AF controls are carried out (S114), an image is captured by driving the shutter after a user has input the release operation order (S115), the CPU 100 acquires the present information, and the captured image undergoes image processing and is recorded along with the acquired present information in the image memory (S116).

When the CPU 100 determines that the fixed-point photographing mode is set, the CPU 100 then determines whether or not a targeted image has been designated (S102). The targeted image is an image that has been photographed before, and the same scene of the targeted image is required to be photographed at the present fixed point. A user can display images recorded in the image memory 112 one-by-one on the monitoring apparatus 15 and designate the displayed image as a targeted image. By making the designation, the photographing mode is automatically set to the sub-operation mode of the camera (S103). Then, the CPU 100 acquires the targeted image's past information that includes its location, posture, azimuth and photographing information, which are recorded in the information memory 165 (S104). On the other hand, when the targeted image is not recorded in the image memory 112 and a user cannot designate the targeted image from the images recorded in the image memory 112, the user can change the sub-operation mode of the camera to the recording mode (S105). In the recording mode, images recorded in a memory of a personal computer connected to the camera can be displayed on either a monitor of the personal computer or on the monitoring apparatus 15 of the camera, with the image displayed on the monitor of the personal computer designated as the targeted image. This designation sets the sub-operation mode of the camera to the photographing mode (S103). Then, the CPU 100 reads out the past information related to the displayed image, and acquires the past information in addition to recording the past information in the information memory 165 (S104). The camera can be connected not only to a personal computer but also to a memory apparatus. When the camera is connected to a memory apparatus, a user can display an image recorded in the memory apparatus and designate that image so that the CPU can then acquire the past information belonging to the designated image, in addition to recording the past information in the information memory 165.

As soon as the CPU 100 has read out and acquired the past information from the information memory 165, the CPU acquires focal length information that includes the focal length of the photographic lens 2, which is connected to the camera body 1. The focal length information can be acquired on the basis of either the type of the photographic lens 2 or information from the zoom driving mechanism 211. At the same time, the CPU 100 acquires the present information that includes the location information measured by the GPS sensor 161, the posture information measured by the orientation sensor 163, the azimuth information measured by the azimuth sensor 164, and the photographing information of the present camera (S106). From then on, the present information is repeatedly acquired at a certain time interval. After acquisition of the present information, the CPU 100 determines whether the focal length information in the present information coincides with the past information (S107). If the photographic lens 2 includes a zoom lens that adjusts the focal length of the entire photographic lens 2, the difference between the past and present focal length information is displayed as the correction value on either the LCD display 12 or the monitoring apparatus 15, as shown in FIG. 5(*a*). Then, if the correction value is outside of the permissible range, the determination message of "NG" is displayed. On the other hand, if the correction value coincides with zero or is inside of the permissible range from adjustments to the focal length made by a user per the determination message, the determination message of "OK" is displayed, as shown in FIG. 5(*b*). In addition, if the past and present focal length information are not equal and the photographic lens 2 has a power zoom function for controlling the motor to adjust the focal length of the entire photographic lens 2 (S108), the CPU 100 controls the zoom driving mechanism 211 so that the present focal length of the photographic lens 2 coincides with the focal length of the past information (S109). Then, a correction value of zero is displayed, as shown in FIG. 5(*b*). At the same time, the determination message of "OK" is also displayed. If the photographic lens 2 presently connected to the camera is a mono-focal lens and the focal length of the mono-focal lens is different from that of the past information, the determination message of "NG" can be displayed and fixed-point photographing may be prohibited.

Next, the CPU 100 acquires the location information, which includes the longitude, latitude, and altitude measured by the GPS sensor 161, and compares the acquired location information with the past location information that was acquired at a previous point in time. In addition, the CPU 100 calculates the difference between the past and present location information, and determines whether or not the calculated difference is within the permissible range (S110). Similar to the location information, the CPU 100 also acquires the posture information and azimuth information measured by the orientation sensor 163 and the azimuth sensor 164, respectively, and calculates the orientation of the camera. The CPU 100 compares the orientation of the camera with the past orientation calculated on the basis of the past posture and azimuth information, and calculates the difference between the past and present information. The CPU 100 then determines whether the difference is within the permissible range (S110). Next the CPU 100 orders either the LCD display 12 or the monitoring apparatus 15 to display the acquired present information, the correction values indicating the difference between the past and present information, and the message showing whether or not the correction values are within the permissible ranges. If all of the longitude, latitude, and altitude correction values that constitute the location information are zero or within the permissible ranges, the determination message of "OK" is displayed, as shown in FIG. 5(b) (S111). If at least one correction value among all of the longitude, latitude, and altitude correction values is outside of the permissible range, the determination message of "NG" is displayed, as shown in FIG. 5(a). Similar to the location information, if all of the correction values, as calculated on the basis of the posture and azimuth information, for the azimuth, the inclined angle between the direction of the optical axis and the horizontal plane, and the angle of inclination between the width direction of the camera and the horizontal plane are zero or within the permissible ranges, the determination message of "OK" is displayed, as shown in FIG. 5(b). If at least one correction value among all correction values for the azimuth and inclined angles is outside of the permissible range, the determination message of "NG" is displayed, as shown in FIG. 5(a).

When the "NG" determination message is displayed for the location of the camera, as shown in FIG. 5(a), it is assumed that a user will move the camera so that the present location coincides with the past location where the targeted image was previously photographed so that the "OK" determination message will be displayed for the location information. For example, by moving the camera from the present location forwards or backwards, left or right, and up or down in reference to the correction values regarding the location of the camera, as shown in FIG. 5(a), the determination message of "OK" can be displayed. Namely, the camera can be easily moved to the same location where the targeted image was previously photographed.

Figure 6A:
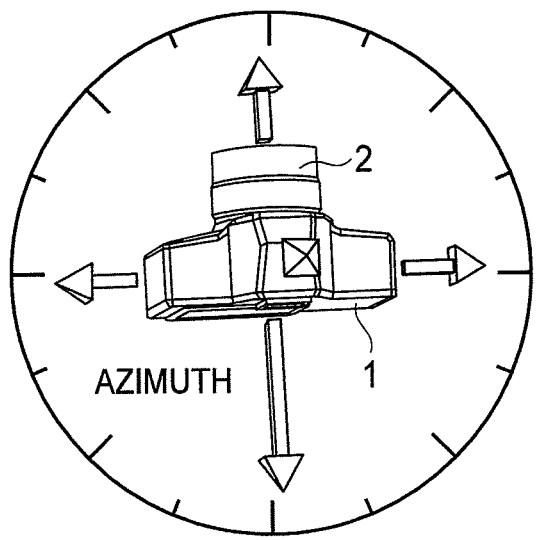
FIG. 6 shows the position and orientation of the camera.
Figure 6B:
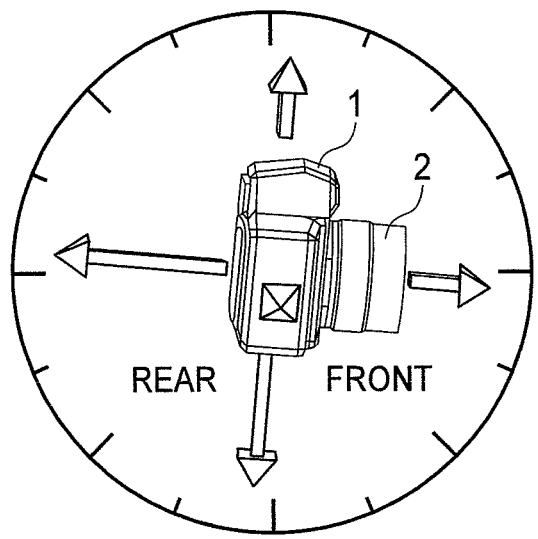
Figure 6C:
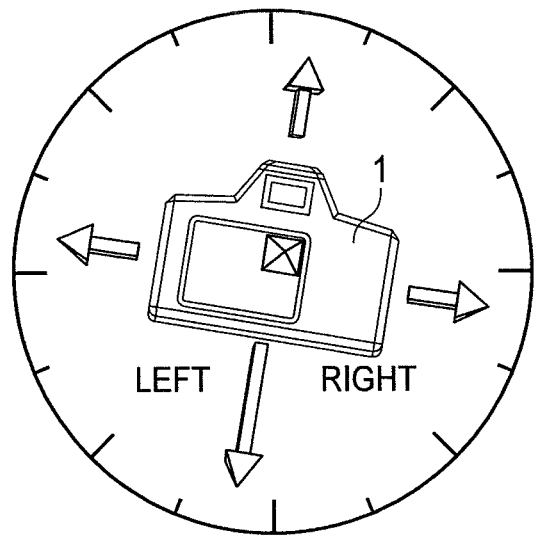

Next, similar to the location, the orientation of the camera, which is equivalent to the azimuth of the optical axis of the photographic lens 2 and the inclination of the width direction and the inclination of the direction of the optical axis, can be adjusted by referring to the correction values regarding the posture and azimuth of the camera, as shown in FIG. 5(a), so that the determination message of "OK" can be displayed. Namely, the camera can be easily oriented toward the same azimuth and inclined in the same posture as the camera was when the targeted image was previously photographed. FIG. 6 shows the azimuth and posture of the camera. FIG. 6(a) shows the azimuth of the camera. FIG. 6(b) shows the inclination of the direction of the optical axis. FIG. 6(c) shows the inclination of the width direction.

When the "OK" determination message is displayed for the location, posture, and azimuth information, the process proceeds to the general photography process. In the general photography process, the quantity and color of ambient light are measured (S112), a distance is measured (S113), the AF control is carried out (S114), an image is captured (S115), and the captured image is recorded in the image memory 112 (S116). Then, needless to say, the photographing information corresponding to the camera settings designated in this photographing operation is recorded in the information memory 165 at the same time that the image is recorded in the image memory 112.

In the above embodiment, fixed-point photographing can be easily carried out because a user can adjust the location and orientation of the camera to match the same location and orientation where an image was captured at a previous point in time, by referring to the displayed correction values until the correction values become zero and the "OK" determination messages are displayed. In addition, in the above embodiment, it is also easy to adjust the focal length so that it matches the same focal length that was designated in the past photographing operation.

Numerical correction values are displayed in the above embodiment. However, arrows or marks indicating the correction values can be displayed instead. For example, if the present location of the camera should be shifted forward by two meters and to the right by one meter, an arrow directed forward and to the right is displayed. When the camera is shifted in the direction of the arrow, the length of the displayed arrow gradually becomes shorter as the camera approaches the location where the camera should be located. And when the camera is moved onto the location, the arrow disappears and the "OK" determination message is displayed. Accordingly, a user can easily set the camera to the same location by moving the camera in the direction of the displayed arrow. If the arrow can be displayed in three dimensions, it is easy to move the camera to the correct location with respect to the vertical direction. In addition, marks other than arrows can be displayed to represent the correction values.

The correction values regarding the location of the camera, the orientation of the camera, and the focal length of the photographic lens 2 are displayed by using the past information, in the above embodiment. However, the correction values regarding all of the components need not be displayed. For fixed-point photographing, the most difficult task is moving the camera to the correct location. On the other hand, a user can easily adjust the view angle and photographing orientation by making visual comparisons with the previously photographed image. Consequently, only the correction values regarding the location of the camera, which are measured by the GPS sensor 161, and the "NG" or "OK" determination messages may be displayed without displaying the correction values pertaining to the camera's orientation and focal length. Likewise, only the correction values may be displayed without displaying the determination messages.

Although the correction value regarding focal information necessary to bring the targeted object into focus, which is the location of the focal point of the photographic lens 2, is not displayed in the above embodiment, the correction value regarding the focal information can be displayed on the basis of the past information that includes the focal information. To display the correction value regarding the focal information, the location of the focal point of a previously photographed object is recorded in the image memory 112. The CPU 100 compares the recorded focal information with the present location of the focal point of the photographic lens 2, which is acquired from the lens mechanism 201 of the photographic lens 2. Then, the CPU 100 displays a difference between the past and present focal point locations of the photographic lens 2 as a correction value. The correction value regarding the location of the focal point helps a user to manually adjust the focal point location of the photographic lens 2 so that the same targeted object that was previously photographed can be brought into focus. If the photographic lens 2 has an autofocus function to bring a targeted object into focus, as shown in FIG. 2, the focal point location of the photographic lens 2 can be automatically adjusted so that the same targeted object that was previously photographed is brought into focus by the CPU 100 controlling the AF driving mechanism 212 of the photographic lens 2 via the AF unit 121 on the basis of the focal information. In the above function, even if a user does not manually adjust the location of the focal point upon moving the camera onto the targeted location, a user can easily photograph the previously photographed target with the present image in focus.

The camera is a digital single-lens reflex camera in the above embodiment. However, the camera is not limited to a single-lens reflex camera, and a lens shutter camera, a still camera, a movie camera, a digital camera, or a film camera as long as the camera is used for fixed-point photographing.

The correction values for the location, posture, and azimuth of the camera, and for the focal length of the photographic lens 2 are displayed on either the LCD display 12 or the monitoring apparatus 15, in the above embodiment. However, the correction values may be separately displayed on different monitors.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2009-022453 (filed on Feb. 3, 2009), which is expressly incorporated herein, by reference, in its entirety.

What is claimed is:

1. A camera comprising:
    a central processing unit (CPU);
    an image memory;
    an information memory;
    a location sensor that detects a present location of the camera;
    a focal length detector that detects a present focal length of a photographic lens of the camera;
    a zoom adjuster; and
    a plurality of monitors; wherein
    at least one of the CPU, the image memory and the information memory records a past location, the past location being a location where an image was photographed at a previous point in time,
    at least one of the CPU, the image memory and the information memory records a past focal length of the photographic lens,
    the CPU compares the present location of the camera with the past location, the CPU calculating a camera location difference between the present location of the camera and the past location,
    the CPU compares the present focal length of the photographic lens with the past focal length of the photographic lens, the CPU calculating a focal length difference between the present focal length of the photographic lens and the past focal length of the photographic lens,
    the zoom adjuster adjusts the present focal length of the photographic lens so that the present focal length of the photographic lens coincides with the past focal length of the photographic lens, the photographic lens having a function for changing the focal length of the photographic lens, and
    at least one of the plurality of monitors displays at least one of the calculated camera location difference and the calculated focal length difference.

2. The camera according to claim 1, wherein the location sensor is a GPS sensor.

3. The camera according to claim 1, further comprising:
    an azimuth sensor that detects a present azimuth of the camera; and
    a posture sensor that detects a present posture of the camera; wherein
    at least one of the CPU, the image memory and the information memory records a past azimuth and a past posture, the past azimuth being an azimuth toward which the camera was oriented when the image was photographed at the previous point in time, the past posture being a posture of the camera when the image was photographed at the previous point in time,
    the CPU compares the present azimuth of the camera with the past azimuth, the CPU comparing the present posture of the camera with the past posture, the CPU calculating an azimuth difference between the present azimuth of the camera and the past azimuth, the CPU calculating a posture difference between the present posture of the camera and the past posture, and
    at least one of the plurality of monitors displays at least one of the azimuth difference and the posture difference.

4. The camera according to claim 3, wherein the azimuth sensor is at least one of an MI sensor and an MR sensor that senses a direction using terrestrial magnetism.

5. The camera according to claim 3, wherein the posture sensor is a three-axis acceleration sensor that senses accelerations in three directions of an X, Y, and Z axis.

6. The camera according to claim 1, wherein
    at least one of the CPU, the image memory and the information memory records a past focal location, the past focal location being a location of a focal point to make a targeted object in focus when the targeted object was photographed before,
    the CPU compares the past focal location with a present focal location, the present focal location being a present location of a focal point of the photographic lens, the CPU calculating a focal location difference between the present focal location and the past focal location, and
    at least one of the plurality of monitors displays the focal location difference.

7. The camera according to claim 6, further comprising an auto focus controller that adjusts the location of a focal point of the photographic lens so that a present targeted object that is brought into focus coincides with a past targeted object that was in focus at the previous point in time.

8. The camera according to claim 1, wherein the CPU determines whether the camera location difference is within a predetermined permissible range, and wherein at least one of the plurality of monitors displays the determination made by the CPU.

9. The camera according to claim 8, wherein the camera has a fixed-point photographing mode, the CPU calculates the camera location difference, and at least one of the plurality of monitors displays the camera location difference when the operation mode of the camera is set to the fixed-point photographing mode.

* * * * *